United States Patent Office 3,186,642
Patented June 1, 1965

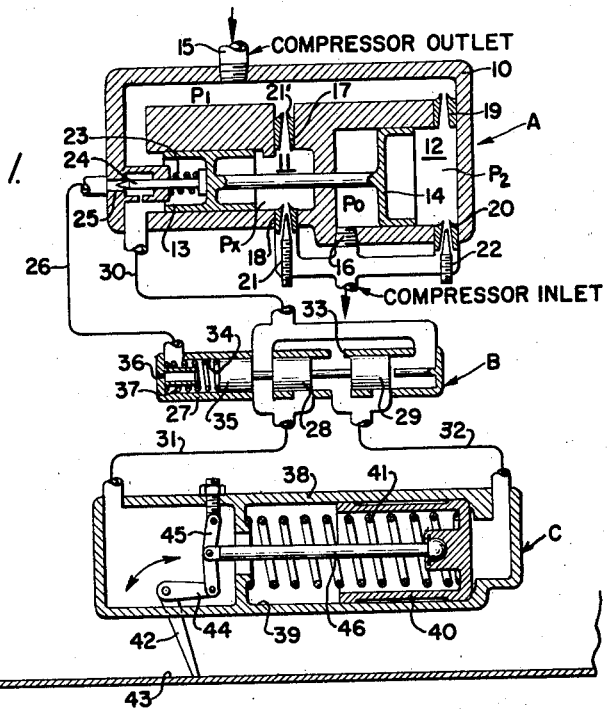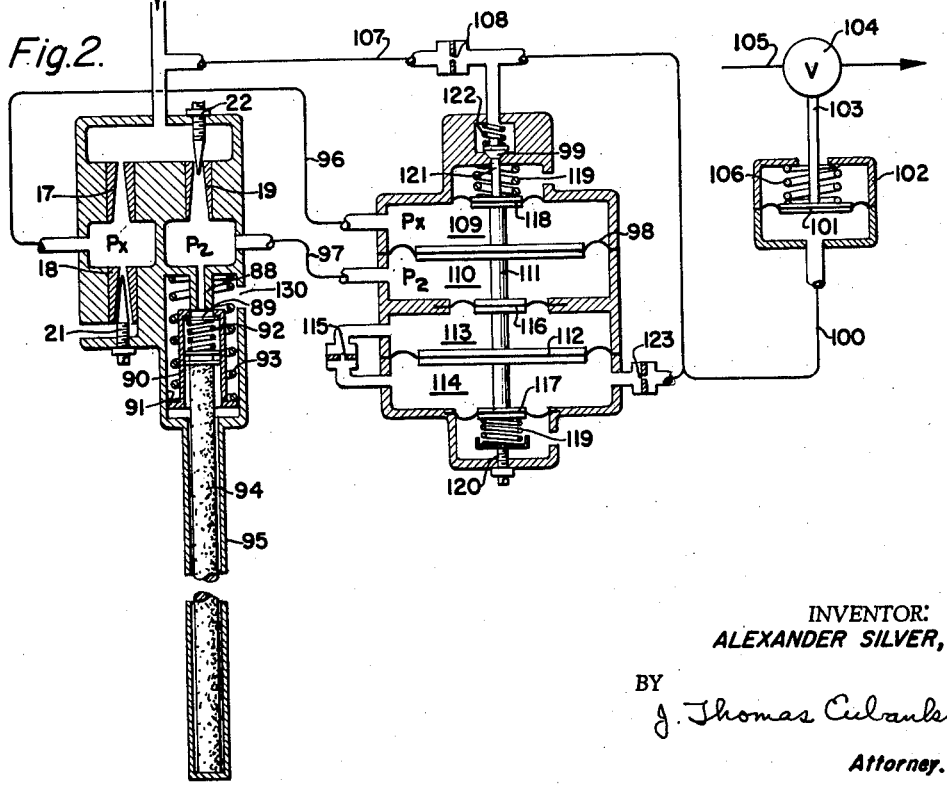

3,186,642
PNEUMATIC CONTROL APPARATUS
Alexander Silver, Tarzana, Calif., assignor to The Garrett Corporation, Los Angeles, Calif., a corporation of California
Application Aug. 16, 1956, Ser. No. 604,421, now Patent No. 3,027,904, dated Apr. 3, 1962, which is a division of application Ser. No. 306,139, Aug. 25, 1952, now Patent No. 2,775,231, dated Dec. 25, 1956. Divided and this application Jan. 5, 1962, Ser. No. 164,539
1 Claim. (Cl. 236—79)

The present invention relates generally to control apparatus, and is more particularly concerned with pneumatic control apparatus which relies for its operation upon variations in the ratio between predetermined fluid pressures.

This application is a true division of my copending application Serial No. 604,421, filed August 16, 1956, now Patent No. 3,027,904 entitled "Pneumatic Control Apparatus," which in turn is a division of application Serial No. 306,139, filed August 25, 1952, now Patent No. 2,775,231 entitled "Pneumatic Control Apparatus."

Heretofore, when it was desired to effect large changes in the pressure ratio setting of a control mechanism the utilization of control apparatus of the conventional type has been impractical. Any solution of the problem should desirably exclude the necessity for changing the areas of pistons, diaphragms, chambers and the like, or changing lever area ratios, as such arrangements become overly complicated and impractical for extremely large pressure ratio changes.

The problem is of particular significance in certain applications, such as speed governors, and like devices, where a ratio type of control is desirable whose setting is varied as a function of another variable such as temperature. The standard bellows and/or diaphragm area ratio arrangement is unsatisfactory where a large variable ratio is of primary importance.

With the foregoing in mind, the present invention has for one object the provision of control apparatus which utilizes the critical flow or sonic velocity of a fluid through the throat of a properly shaped restriction, for example, such as a nozzle, to provide pressures which are proportionate to a pressure having large variations, but which are within such ranges as to permit utilization of movable wall means for the actuation of control devices.

A further object is to provide control mechanism, wherein an orifice-nozzle or nozzle-nozzle combination, operating on the principles of critical flow is utilized as a pressure divider, and is arranged to actuate a control device in response to changes in a characteristic of a sensed medium, such as pressure, temperature, and the like.

Another object of the invention is to provide in devices of the character described, a pressure divider having an improved nozzle construction containing a sharp leading or entrance edge.

Still another object of the invention is to provide improved pressure ratio control apparatus, which is extremely reliable in operation, inherently resistant to temperature changes and vibration, more economical to build, and which occupies less space, is simple of construction but capable of rugged use.

To this end, the present invention in one form briefly comprises some form of mechanism arranged to operate in response to variations in a pressure ratio, the ratio pressures being obtained by means of a pressure divider utilizing an orifice-orifice and/or orifice-nozzle arrangement connected for series fluid flow through restricted passages wherein sonic velocity is obtained in the throats of the orifices and nozzles. The ratios of pressures are balanced by the ratios of the areas of movable wall means upon which the pressures obtained from the pressure divider are acting. Any change in the predetermined or function variable ratios is arranged to create an unbalance which is utilized to activate some form of control device, or the pressure ratio may be modified by a function of some other auxiliary control.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

FIG. 1 is a view schematically illustrating one form of control apparatus embodying the features of the invention, arranged to operate in response to the changes in the ratio of inlet and outlet pressures of a compressor; and FIG. 2 illustrates another modified form, wherein the pressure ratio is varied in response to temperature changes of a sensed medium.

Referring more specifically to the drawings, for illustrative purposes, FIG. 1 illustrates control apparatus according to the present invention which embodies three component devices, namely, a pressure ratio sensing unit A, a pneumatic relay B and a valve actuator mechanism C.

As shown, the pressure ratio sensing unit A comprises a housing structure 10 of suitable material, this housing having an internal valve structure so formed as to provide internal cavities or chambers 11 and 12 which in this instance form cylinders within which interconnected pistons 13 and 14 respectively are supported for reciprocal movement.

The housing 10 is provided with a connection 15 which is connectible with a source of fluid pressure, shown in this instance as being a compressor outlet, and a connection 16 to atmosphere or the compressor inlet. The high pressure within the housing 10 is indicated by the designation $P_1$, whereas the connection to atmosphere pressure is indicated by $P_0$. These pressures are interconnected within the housing through parallel flow passages which respectively include the chambers 11 and 12. The chamber 11 is intermediate an upstream nozzle 17 and a downstream nozzle 18, whereas the chamber 12 is intermediate an upstream nozzle 19 and a downstream nozzle 20. The nozzles are so designed that the ratio of exit pressure to the entrance or upstream pressure is less than a critical value, depending upon the particular fluid being handled, and such that sonic velocity is attained at the throat. By utilizing a divergent conical passage from the throat of the nozzle, a considerable recovery of pressure is obtained without altering the critical ratio existing between the pressure at the throat of the nozzle and the entrance. By this means sonic flow will be obtained at the throat of both nozzles although the ratio of exhaust or recovered pressure at the end of the divergent nozzle to the total pressure at the nozzle inlet is higher than the critical pressure ratio required for sonic flow through the nozzle. This greatly extends the range of operation of the ratio sensing unit.

The sets of nozzles thus provided in each of the parallel flow paths forms in effect a pressure divider which acts to form an intermediate pressure $P_X$ in chamber 11 and an intermediate pressure $P_2$ in chamber 12, which proportionally reflect over a smaller range variation in the upstream pressure $P_1$. While the nozzles of the pressure divider may be as described above, the linear operation of the divider may be extended at lower inlet densities of the fluid by providing a sharp inlet or leading edge 21', as indicated in FIG. 1.

The intermediate pressure $P_X$ and $P_2$ may be adjustably controlled by adjusting the flow through either the upstream nozzle or the downstream nozzle. In the present instance, provision is made for adjusting flow through the nozzle 18 by means of an adjustable needle valve 21, and the flow through nozzle 20 by a needle valve 22.

In the arrangement shown, the intermediate pressures $P_x$ and $P_2$ respectively act in the same direction against the interconnected pistons 13 and 14 respectively, while the upstream pressure $P_1$ and pressure $P_0$ respectively act on the pistons 13 and 14 in the opposite direction. Thus an arrangement is provided wherein a balanced condition may be established for a desired overall pressure ratio $P_1/P_0$ by adjusting the needle valves 21 and 22. First the needle valve 22 is adjusted so that the ratio of $P_2$ to $P_1$ is the same as the ratio of the effective area of piston 13 to piston 14. Thus, the forces acting on the ends of the pistons 13 and 14 will be balanced for all values of $P_1$ sufficiently high to cause sonic flow in the throat of nozzles 19 and 20. Next, the needle valve 21 may be adjusted to give a pressure $P_x$ so that the ratio of $P_1$ to $P_x$ times the ratio of the effective areas of piston 14 to piston 13 is equal to the desired overall ratio of $P_1$ to $P_0$.

A light spring 23 is provided so that during movement of the interconnected pistons 13 and 14, or other suitable wall means, such as interconnected diaphragms or the like, this spring will act to diminish instability or droop. Advantage may be taken of such movement of the piston structure to operate a suitable device. In this case, the movable wall means are connected to a valve 24 which is operatively associated with a port opening 25 and controls the flow of high pressure $P_1$ fluid into a connection conduit 26.

The pneumatic relay B, as disclosed, comprises briefly an elongate housing 27 within which is reciprocally mounted a pair of valve members 28 and 29 by which the high pressure $P_1$ in a connection conduit 30 is selectively connectable with conduits 31 and 32, the conduit which is not connected to the high pressure being vented through a port opening 33.

One end of the housing 27 is arranged to form a pneumatic cylinder 34 having operative relationship with a piston 35 which is connected to the valve members 28 and 29. The left end of the cylinder 34 is connected with conduit 26, and is also vented to atmosphere through a restricted passage 36, and houses an expansion spring 37 which exerts a biasing action upon the piston 35 tending to move the valves to a position wherein conduit 31 is connected to the pressure $P_1$ and conduit 32 is vented to atmosphere.

The valve actuator mechanism C may assume varied forms of construction. In the present case, it is shown as comprising a hollow housing 38, a portion of this housing being arranged to form a pneumatic cylinder 39 within which there is reciprocally mounted a piston 40 which is normally biased toward the right end of the cylinder by an expansion spring 41.

Movements of the piston 40 are utilized to actuate a valve 42 positioned in a flow duct 43. The valve is swingably supported and carries an actuating crank arm 44 having its outer end connected with a toggle joint 45 which is interconnected with the piston 40 through a piston rod 46. The conduits 31 and 32, it will be observed, communicate with opposite sides of the piston 40 and the valve 42 is arranged to be in closed position, when the piston 40 is at the extreme position of its movement to the right end of the cylinder 39.

Having explained this embodiment of the invention in detail, the operation will now briefly be considered. As before mentioned, the needles 21 and 22 are adjustable so as to select any desired pressure ratio above a certain minimum, such minimum being established by design characteristics of the particular nozzles. For example, if it is desired to actuate the valve 42 in the opening direction when the pressure ratio reaches or exceeds 4:1, suitable values for the areas of pistons 13 and 14 are so chosen that the piston 14 will be twice that of piston 13, and the pressure ratio $P_1/P_2$ will be set to balance at the same ratio. The pressure ratio selector needle 21 will then be set so as to cause $P_1/P_x$ to equal 2, in which case the overall ratio $P_1/P_0$ will equal 4:1. This would constitute the balanced condition of the movable wall structure. When the high pressure $P_1$ is below a value at which the balanced condition obtains, the unbalance of the movable wall structure is in a direction to maintain the valve 24 in the open position.

With the valve 24 open, the pressure $P_1$ flows through conduit 26 to the cylinder 34, where, with the aid of the spring 37, it forces the piston 35 and the connected valve members 28 and 29 to the right so that the pressure $P_1$ is admitted through conduit 31 to the left side of the piston 40 of the valve actuator mechanism C. The pressure $P_1$ augmented by the force of the spring 41 actuates the toggle joint 45 in a direction to hold the valve 42 in the closed position.

When the set ratio $P_1/P_0$ is attained, a balanced condition is reached in the ratio sensing unit A, as explained hereinabove. If the high pressure $P_1$ increases to a value above that at which the balanced condition obtains, the valve 24 is moved to a closed position to shut off flow through conduit 26. Pressure in the cylinder 34 will then bleed through the restricted passage 36 to atmosphere permitting the pressure $P_1$ which is always present at the other end of the housing 27 to move the valves 28 and 29 to a position wherein valve 29 will connect the pressure $P_1$ with conduit 32 to overcome the force of the spring 41 and move the piston 40 in a leftwardly direction to open the valve 42. It will be appreciated that the utilization of the pressure ratio sensing unit A in connection with the other components just described is exemplary of only one manner of use of the sensing unit, and varied arrangements are possible to meet the particular installation conditions.

FIG. 2 illustrates a modified form of the invention in which a temperature sensing element is utilized. The arrangement in this case similarly employs two pressure dividers in parallel flow passages in the same manner as shown generally in FIG. 1. However, in the arrangement of FIG. 2, the nozzle 20 has been replaced by an orifice 88 and the needle 22 is associated with the nozzle 19 for utilization in regulating the intermediate pressure $P_2$.

Flow through the orifice 88 is modulated in response to temperature changes of a sensed medium by means of a valve disk 89 arranged for limited movement within a sleeve member 90 supported for guiding movement within a chamber 91. The valve disk 89 is biased by a spring 92 toward a limiting position of movement, and the sleeve 90 is likewise biased in a downward direction by a spring 93 with a portion of the sleeve making pressure engagement with one end of a rod member 94 which extends into a tubular extension 95 of the housing and has its other end bearing against the associated end of the extension. Also provided in the housing 95 is a vent opening 130 to permit the fluid flowing from the orifice 88 to escape to the surrounding atmosphere. The rod 94 and the housing 95 are constructed of materials having different temperature coefficients, the housing extension being of a material which will expand a greater amount than the material of the rod 94 for a specific temperature change. Thus, with temperature increases, the effect is to move the valve disk 89 away from the open end of orifice 88 to permit greater flow and thus decrease the intermediate pressure $P_2$.

The two pressure dividers are connected to form a pneumatic bridge in which the nozzles 17 and 19 are connected to a common source of pressure, and in which the intermediate chambers between the nozzles of the pressure dividers are respectively connected through conduits 96 and 97 with chambers 109 and 110 of a balanced pilot valve 125 in which the intermediate pressures $P_x$ and $P_2$ of the pneumatic bridge are applied on the opposite sides of a diaphragm 98 carried by a shaft 111. The shaft 111 also carries a diaphragm 112 positioned between and separating chambers 113 and 114, these chambers being interconnected through a passage containing a restricted orifice 115. The shaft is supported for reciprocable movements on small spaced flexible supports which consists of an intermediate diaphragm 116 between the chambers 110 and 113, a diaphragm 117 adjacent one end of the shaft and a separating chamber 114 from ambient atmosphere, and a diaphragm 118 adjacent the other end of the shaft and separating chamber 109 from ambient atmosphere. The normal axial position of the shaft 111 is determined by means of suitable balancing springs 119 mounted at the shaft ends, one of which may be adjusted by means of a threaded stud structure 120.

A bleed valve 99 is arranged to control flow from a conduit 100 to atmosphere in response to movements of shaft 111. The valve 99 has a stem 121 which abuts the diaphragm 118, the valve being biased towards seating position by an expansion coil spring 122.

The conduit 100 is in communication with the chamber 114 through a restricted orifice 123 and also with one side of a diaphragm 101 of an actuator 102, which has a stem 103 operatively connected with a valve 104 for controlling in this case the flow of a fluid, for example, through a pipe 105. The opposite side of the diaphragm 101 is engaged by an expansion spring 106 which biases the diaphragm in a direction to cause opening of the valve upon decrease of the pressure acting on the opposite side of the diaphragm from that upon which the spring 106 bears. As shown, pressure is supplied from the high pressure source through a conduit 107, a restricted orifice 108, and thence through conduit 100 for motivating the actuator 102 in response to the operation of the valve 99.

Thus, in the arrangement shown, when the diaphragm 98 is in a balanced condition and the disk valve 89 is moved toward the orifice 88, the pressure $P_2$ is increased and acts to force the diaphragm 98 upwardly to open the valve 99 so as to reduce the pressure acting on the diaphragm 101. Upon reduction of this pressure, the spring 106 forces the diaphragm downwardly and causes the valve 104 to move toward a position of increased opening. Conversely, upon increased temperatures of the sensed medium, the valve 104 will be actuated toward closed position. It is possible that a condition may arise wherein the pressure in conduit 107 may suddenly vary without there being a change in differential pressure acting on the diaphragm 98, which would tend to open or close the valve 99. As a consequence, this change in pressure would tend to be carried through the conduit 100 and cause the actuator 102 to effect an undesired change in the position of valve 104. This is counteracted by a stabilizing action of the pilot valve. For example, if the pressure increases in conduit 100, tending to close valve 104, there will be a flow through the restricted orifice 123 into chamber 114, wherein the increased pressure will act through the diaphragm 112 and move shaft 111 in a direction to slightly increase the opening of valve 99 and thus restore the pressure in conduit 100 and reestablish the position of the valve 104.

From the foregoing, it will be appreciated that the present invention is susceptible of varied embodiments depending upon the particular installation in which it is to be utilized, and that as a consequence various other modifications may suggest themselves to those skilled in the art without departing from the spirit of the invention disclosed herein. It is therefore not desired to restrict the invention to the specific form or forms shown or uses mentioned except to the extent indicated in the appended claim.

I claim:

Control apparatus comprising:
a pressure sensing unit having a pair of parallel flow passages connected with a common fluid pressure source;
a pair of spaced restricted sonic velocity flow openings in each of said passages whereby an intermediate pressure is effected between each of said pair of flow openings;
means for adjusting one of the restricted flow openings in each of said flow passages to preset said intermediate pressures to desired values;
means for modulating flow through the remaining restricted flow opening of one of said flow passages in response to changes in a character of a sensed medium;
pilot valve means including a first balanced pressure responsive movable wall;
means for subjecting one side of said first movable wall to the intermediate pressure in one of said pair of flow passages;
means for subjecting the other side of said first movable wall to the intermediate pressure in the other of said pair of flow passages;
an actuator having a connection with the fluid pressure source supplying fluid to the flow passages of the pressure sensing unit;
means responsive to movements of said first movable wall for modulating flow of fluid from the fluid pressure source to said actuator;
and stabilizing means including a second pressure responsive movable wall in said pilot valve means arranged to cooperate with said first pressure responsive movable wall to counteract surges in the fluid flowing to said actuator.

References Cited by the Examiner

UNITED STATES PATENTS

| | | | |
|---|---|---|---|
| Re. 24,410 | 12/57 | Drake | 121—38 |
| 1,455,633 | 5/23 | Lundgaard. | |
| 2,524,445 | 10/50 | Infield | 236—79 |
| 2,544,427 | 3/51 | Infield | 236—79 |
| 2,570,624 | 10/51 | Wyckoff | 121—41 |
| 2,641,105 | 6/53 | Drake. | |

FOREIGN PATENTS 135,628   1/47   Australia.

EDWARD J. MICHAEL, *Primary Examiner.*

FREDERICK L. MATTESON, Jr., *Examiner.*